United States Patent [19]

Richardson et al.

[11] Patent Number: 5,520,944
[45] Date of Patent: *May 28, 1996

[54] PROCESS FOR PREPARING A BACON PRODUCT

[76] Inventors: John S. Richardson; John G. Richardson, both of Sugar Creek Packing Co., Industrial Park, Washington Court House, both of Ohio 43160

[ * ] Notice: The term of this patent shall not extend beyond the expiration date of Pat. No. 5,132,126.

[21] Appl. No.: 834,869

[22] Filed: Feb. 13, 1992

Related U.S. Application Data

[63] Continuation of Ser. No. 729,792, Jul. 10, 1991, Pat. No. 5,132,126, which is a continuation of Ser. No. 368,461, Jun. 19, 1989, abandoned.

[51] Int. Cl.⁶ .................. A23L 1/01; A23L 1/31
[52] U.S. Cl. ........................ 426/438; 426/511
[58] Field of Search .................. 426/241, 242, 426/243, 410, 412, 417, 438, 511; 99/403, 404, 407, 416, 418

[56] References Cited

U.S. PATENT DOCUMENTS

| | | | |
|---|---|---|---|
| 2,191,275 | 2/1940 | Fink | 426/438 |
| 2,547,747 | 4/1951 | Darrow | 426/417 X |
| 2,562,850 | 7/1951 | Winslow | 426/438 X |
| 3,321,314 | 5/1967 | Jeppson . | |
| 3,346,391 | 10/1967 | Miller et al. | 426/417 |
| 3,365,301 | 1/1968 | Lipoma et al. . | |
| 3,497,363 | 2/1970 | Fox | 426/438 X |
| 3,512,993 | 5/1970 | Conley et al. | 426/438 X |
| 3,554,770 | 1/1971 | Lipsky et al. . | |
| 3,619,215 | 11/1971 | Bard et al. . | |
| 3,674,504 | 7/1972 | Lane . | |
| 3,733,202 | 5/1973 | Marmor | 426/438 X |
| 3,916,030 | 10/1975 | Bard et al. | 426/113 |
| 4,132,810 | 1/1979 | Knutson | 426/438 X |
| 4,141,487 | 2/1979 | Faust et al. | 426/113 X |
| 4,163,804 | 8/1979 | Meyer et al. | 426/438 X |
| 4,419,373 | 12/1983 | Opperman | 426/234 |
| 4,667,589 | 5/1987 | Bishop | 99/386 |
| 4,786,513 | 11/1988 | Monforton et al. | 426/107 |
| 4,847,099 | 7/1989 | Elinsky | 426/417 X |

FOREIGN PATENT DOCUMENTS

| | | | |
|---|---|---|---|
| 316427 | 12/1971 | U.S.S.R. | 426/438 |
| 2051550 | 1/1981 | United Kingdom | 426/438 |

*Primary Examiner*—Arthur L. Corbin
*Attorney, Agent, or Firm*—Thompson Hine & Flory

[57] ABSTRACT

A process for the preparation of bacon having improved taste and aesthetic appearance which is suitable for heating in a microwave comprising the steps of:

providing slices of uncooked bacon;

placing said slices of uncooked bacon between a pair of screen members;

conveying said uncooked bacon between said screen members into a bath of hot cooking oil and/or bacon grease;

maintaining said bacon in said bath for a period of time sufficient to cook said bacon to the desired degree of crispness;

conveying the cooked bacon from said bath, and;

removing said bacon from between said screen members.

1 Claim, 1 Drawing Sheet

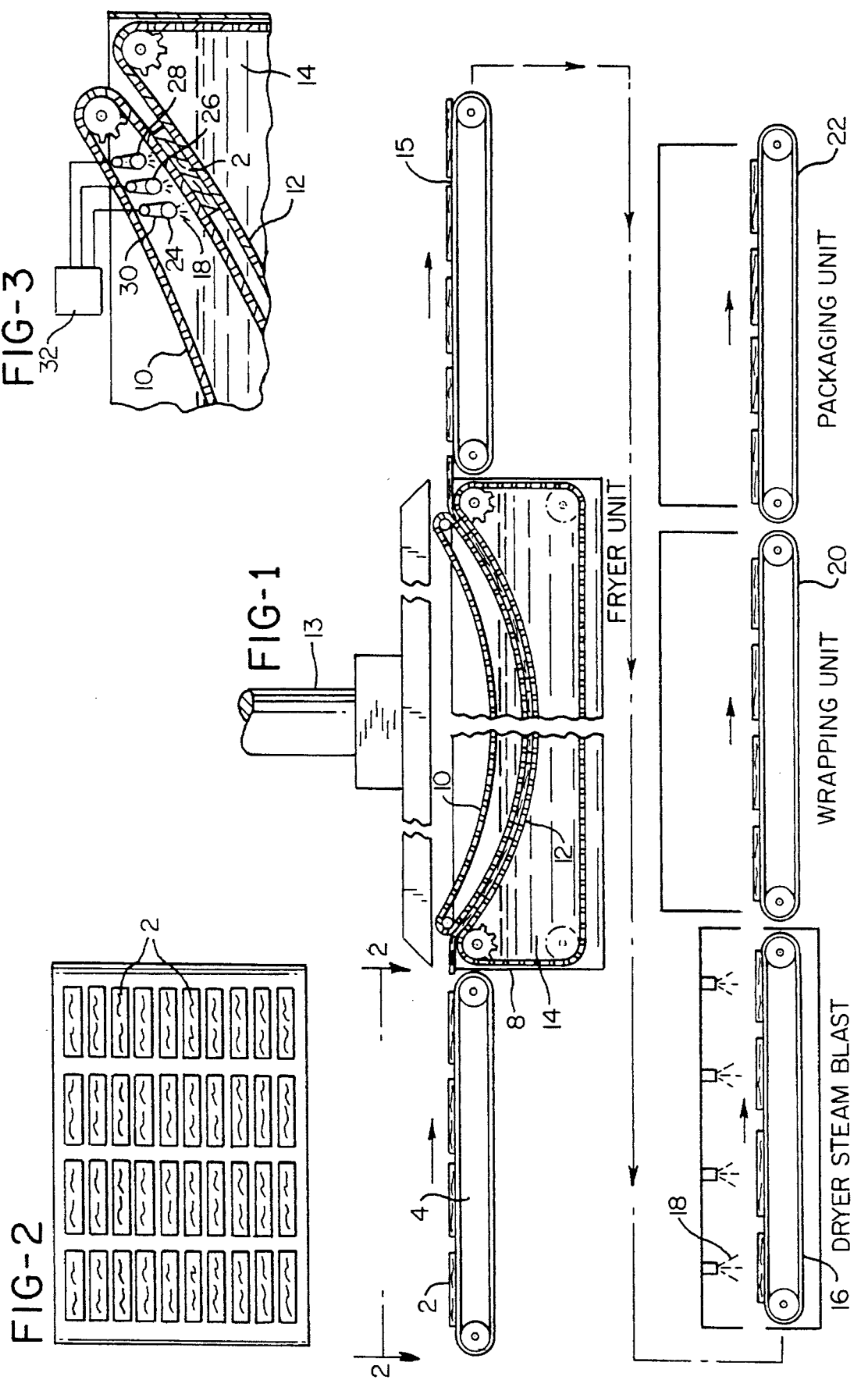

PROCESS FOR PREPARING A BACON PRODUCT

This is a continuation of application Ser. No. 07/729,792 filed Jul. 10, 1991, now U.S. Pat. No. 5,132,126, which is a continuation of Ser. No. 07/368,461, filed Jun. 19, 1989, now abandoned.

BACKGROUND OF THE INVENTION

1. Field of the Invention

The present invention relates generally to food processing and more particularly to a process for cooking bacon and similar meat products.

2. Description of the Prior Art

In recent years, a new heating method has been developed to overcome the foregoing disadvantages of conventional heating methods. This new method employs microwave energy. In spite of the advantages of microwave cooking, this cooking method has not been completely successfully utilized heretofore for the cooking of bacon for the following reasons. When bacon is cooked by microwaves, the bacon is reduced unevenly and tends to "blossom" or wrinkle in a characteristic rosette pattern. Bacon which has "blossomed" is not readily marketable because it is not aesthetically pleasing. Additionally, because the bacon slices are reduced unevenly the bacon product cannot be packaged by automatic or semi-automatic packaging means. Furthermore when bacon slices are shingled, that is partially overlayed to permit more compact packaging, microwave heating causes the protein portions of the bacon strips to adhere to each other making it very difficult to separate the shingled strips.

Additionally, cooking the bacon using microwaves, suffers from the further disadvantage in that because of its high fat content, bacon is especially messy to cook in a microwave oven. That is most microwave cooking instructions state that the bacon should rest on an absorbent surface such as paper towels in order to reduce splattering of the grease within the oven. Naturally this step is inconvenient, it produces messy paper towels to handle and dispose of after cooking.

Cooking the bacon using microwaves suffers from the additional disadvantage in that the raw bacon contains a substantial amount of grease and moisture, which causes a large build-up of heat and steam during the cooking process. This build-up of heat and steam, forces the consumer to wait for a cool-down period before the consumer can consume the bacon product. Further, this build-up of steam actually presents a danger for the consumer, in that if the consumer does not wait for the prescribed cool-down period, the consumer may suffer severe burns by prematurely opening the package and releasing the hot grease and steam.

Another difficulty with cooking bacon in a microwave oven arises from the fact that bacon is heterogeneous, with areas of fat and areas of lean within the same slice. Because fat and lean absorb microwave energy at different rates, it is difficult to obtain uniform cooking even within the same slice. This problem is aggravated by the fact that the bacon slices tend to curl as they are cooked. As a result, pools of melted fats and oils can accumulate on the surface of the bacon thereby causing even further non-uniformity.

Some of these difficulties encountered in attempting to cook bacon utilizing microwaves have been overcome by reformulating the food products, designing special equipment to be used with the microwave oven, or specifying detailed instructions for cooking particular food products.

Cooking of bacon in oil or grease as opposed to conventional or microwave cooking methods, has the advantage that the bacon can be cooked in its own grease thereby improving the flavor of the bacon. Additionally, oil cooking has the further advantage that the degree of crispness may be controlled during the cooking process. Further, as oil-cooking uniformly heats the bacon, burnt ends and undercooked portions are avoided. In spite of the advantages of oil cooking of bacon, the disadvantage remains that when the bacon is cooked, it is reduced unevenly and tends to "blossom" or wrinkle in the characteristic rosette pattern. Additionally, cooking bacon with oil suffers from the further limitation in that increased time and expense is incurred by the consumer.

Thus a need has arisen in the art for a process for the preparation of bacon which would utilize the advantages of conventional, oil and microwave cooking/heating processes, which would not involve the disadvantages associated with each of those methods for the cooking of bacon.

SUMMARY OF THE INVENTION

In accordance with the present invention, disclosed is a process for the preparation of bacon having improved taste and aesthetic appearance which is suitable for heating in a microwave comprising the steps of:

providing slices of uncooked bacon;

placing said slices of uncooked bacon between a pair of screen members;

conveying said uncooked bacon between said screen members into a bath of hot cooking oil and/or bacon grease;

maintaining said bacon in said bath for a period of time sufficient to cook said bacon to the desired degree of crispness;

conveying the cooked bacon from said bath, and;

removing said bacon from between said screen members.

One object of the present invention is to utilize the advantages of conventional cooking of bacon, i.e., cooking bacon in its own grease for improved flavor and having the ability to control the crispness of the bacon.

Another object of the present invention is to provide bacon which is uniform in appearance and shape by cooking the bacon while maintaining it between two screens.

Another object of the present invention is to provide a bacon product which can be quickly, safely and efficiently heated by consumers utilizing current microwave technology.

Another object of the present invention is to provide a pre-cooked bacon product which is uniform in size and appearance having improved flavor which can be utilized by the consumer "straight from the package" without the need for any microwave cooking if desired by the consumer.

A still further object of the present invention is to provide a pre-cooked bacon product which will maintain freshness for an extended period of time.

These and other objects are accomplished with the present invention wherein bacon is cooked between two screens on a deep fat conveyorized fat fryer and then packaged for reheating in a microwave oven.

BRIEF DESCRIPTION OF THE DRAWINGS

FIG. 1 is a schematic representation of a process line including the cooking of bacon between two screens on a deep fat conveyorized fat fryer and the subsequent packaging of the bacon for reheating in a microwave oven.

FIG. 2 is schematic representation of the preferred orientation of the bacon slices as they are conveyed through the process represented by FIG. 1.

FIG. 3 is a schematic representation of an alternative method of removing cooking oil and grease from the bacon slices upon exiting the deep fat conveyorized fat fryer.

DETAILED DESCRIPTION OF THE PREFERRED EMBODIMENT

FIG. 1 depicts the preferred embodiment of the present invention for purposes of illustration only. Those skilled in the art will readily recognize from the following discussion that alternative embodiments of the structures and methods illustrated herein may be employed without departing from the principals of the invention described herein.

Step 1, not shown, is to obtain slices of raw bacon for cooking in the deep fat conveyorized fat fryer. Natural bacon, i.e., bacon that is sliced directly from the slab is preferred. Also processed bacon products, such as those wherein chopped meat and fat are extruded and then sliced, can be utilized with the present invention. In addition, bacon-like products made from vegetable sources of proteins and fats are also suited for use in the present invention. Accordingly, the term "bacon" as used in this specification and the appended claims is intended to refer to these bacon-like products as well.

It should be noted that the term "sliced" as used in this specification and the appended claims, is intended to be interpreted broadly as referring to bacon or bacon-like products which have the general shape of slices, i.e. generally thin and flat. Accordingly, products which have been extruded or otherwise been given the shape of sliced bacon product are intended to be included within this term.

In a subsequent step of the process, the slices of bacon 2 are loaded onto a belt conveyor extension 4 which is associated with a deep fat conveyorized fat fryer. The slices of bacon 2 are loaded onto extension 4 with the longer edge parallel to the direction of travel of extension 4. As shown in FIG. 2, the preferred arrangement for the bacon slices 2 on extension 4, is in a row and column orientation. The number of slices of bacon in any given row will be limited by the size of a conveyor means. As the conveyor is continuous, there is no limitation on the length of the column of the slices of bacon. The preferred number of slices of bacon per row in the present invention is ten slices per row.

In a subsequent step the bacon slices 2 are conveyed from extension 4 into fryer 8. The preferred fryer is a deep fat conveyorized fat fryer such as those available from Stein Company of Sandusky, Ohio. The bacon slices 2 are cooked in their own fat in fryer 8 for a length of time sufficient to produce bacon of the desired crispness. The typical time is usually 3 to 5 minutes depending upon the thickness of the slice, the grade/type of bacon being cooked, and the oil temperature. Initially the deep fat conveyorized fryer may be primed with cooking oil, however, the grease from the cooked bacon will permeate the oil so that the bacon cooks in its own grease for an improved flavor.

As bacon slices 2 are conveyed through the deep fat conveyorized deep fat fryer 8, they are held firmly between screen members 10 and 12 to prevent the curling of the bacon strips and to provide bacon strips of a uniform size and shape. The screen members may be any of the types commonly known in the art. Typically, the screen is a ¼ inch mesh stainless steel screen. Those skilled in the art of food preparation will recognize that larger or smaller mesh screens may also be used and the screens may be constructed from other materials.

In the preferred embodiment, screens 10 and 12 are of a conveyor-belt-type design and jointly operate to convey slices 2 through fryer 8.

In another possible embodiment, lower screen 12 conveys bacon slices 2 through fryer 8, and upper screen 10, as a stationary unit, is placed over bacon 2 and carried on screen 12 during cooking to hold bacon slices 2 in place and to produce bacon slices of a uniform shape. After cooking upper screen 10 is removed.

Screens 10 and 12, in the preferred embodiment, initially slope downward within fryer 8 in order to immerse slices 2 in the oil 14 which is present in fryer 8. At or about the midpoint of travel through fryer 8, screens 10 and 12 slope upward to remove slices 2 from contact with oil 14, and eventually remove slices 2 from fryer 8 at the end of travel of screens 10 and 12. As the bacon is conveyed between screens 10 and 12 in fryer 8, hot oil bath 14 cooks slices 2 to a uniform size and texture. Texture and crispness of slices 2 are a function of the type of bacon selected, the temperature of the oil and the time in which the bacon is maintained in contact with the hot oil 14. In the preferred embodiment the bacon is maintained in oil having a temperature range of 250°–300° F. for a period of 3–5 minutes. Hood and vent assembly 13 captures and removes undesirable grease, water and/or oil fumes which are emitted by fryer 8.

In a subsequent step bacon slices 2 exit fryer 8 and are carried by intermediate conveyor 15 to drying conveyor means 16. During this step of the process, oils and/or greases which have collected on the upper surface of the bacon during the cooking process in fryer 8, are removed from slices 2. This excess oil and/or grease is removed by contacting slices 2 with dry steam at approximately 125 pounds per square inch pressure for a time period of about 5 to 10 seconds. In the preferred embodiment, the steam spray is continuous and the bacon slices 2 are brought in contact with the steam 18 while being continuously conveyed by conveyor means 16. It is also envisioned in the preferred embodiment that the excess oil/grease that is removed during this process will be collected and may be added to fryer 8 to further improve the flavor of bacon slices 2.

FIG. 3 illustrates an alternative embodiment of the present invention with respect to the removal of the oils and/or greases which have collected on the upper surface of the bacon slices 2 during the cooking process in fryer 8. As illustrated in FIG. 3, as bacon slices 2 travel on the upward slope between screens 10 and 12 and are removed from contact with hot cooking oil 14, but before slices 2 exit fryer 8, slices 2 are contacted with dry steam 18. In the preferred embodiment, the steam spray is continuous and bacon slices 2 are brought in contact with the steam 18 while being continuously conveyed by screens 10 and 12. Slices 2 are contacted with dry steam 18 at approximately 125 pounds per square inch pressure for a time period of approximately 5 to 10 seconds. After removing hot cooking oil and/or grease from the surface of bacon slices 2, hot dry steam 18 is simply removed through hood and vent assembly 13. Any of steam 18 which condenses and contacts said hot cooking oil and/or grease 14, is immediately vaporized and is again removed through hood and vent assembly 13. The advantage realized from the alternative embodiment shown in FIG. 3, is that when slices 2 are contacted with dry steam 18, said dry steam being emitted by nozzles 24, 26 and 28, screens 10 and 12 hold bacon slices 2 in place, and slices 2 are not blown about by the 125 pounds per square inch pressure which is supplied to nozzels 24, 26 and 28. Nozzels 24, 26 and 28 are typically constructed of stainless steel and are approximately ⅜" in diameter with steam 18 being emitted from nozzels 24, 26 and 28 through a series of apertures 30 present in nozzels 24, 26 and 28. In a preferred embodiment, the apertures 30 are maintained in a staggered orientation in order to insure that steam 18 is supplied over the entire surfaces of bacon slices 2. Those skilled in the art will realize that the number of nozzles and the orientation of the apertures 30 may be varied, so long as dry steam 18, which is supplied from steam source 32, contacts bacon slices 2 and removes the build-up of hot cooking oil and/or grease present on the surface of bacon slices 2.

After having been cooked and dried under either embodiment of the present invention, slices 2 are transported by conveyor means to wrapping means 20.

In a subsequent step, the cooked and dried bacon slices 2 are received by wrapping means 20 wherein slices 2 are wrapped in an air and water occlusive enveloping material. Wrapping means known in the art may be used for the present invention. Preferably the bacon slices are wrapped with a layer of heat-sealable food wrap film and sealed by heating. In the preferred embodiment, the slices 2 are sealed by wrapping means 20 utilizing a vacuum operation and/or a backfilling operation with an inert gas such as nitrogen in order to produce a stable environment for the bacon slices 2 and improve the shelf life of the bacon. In the preferred embodiment, each slice of bacon is individually wrapped and sealed in the manner just indicated, in order to permit the consumer to unwrap individual slices of bacon without breaking the seal and contaminating the remaining slices. Also in the preferred embodiment, the slices, although individually wrapped, are connected in groups of four with a method of separation between them, e.g., having serrations between the individual slices.

In a final step of the process the slices 2 are packaged for transport and sale to the consumer. Although the packaging may take a number of forms, preferred packaging for the present invention comprises groups of four slices, which are inserted four or five to a consumer carton so that the consumer is provided with a convenient sixteen or twenty-pack carton of bacon slices. The consumer cartons are located at packaging station 22. Because these slices have been precooked, they may be readily used directly from the package in numerous applications such as salads, sandwiches, direct consumption, or they may be heated in a microwave to provide hot slices of bacon having improved flavor and aesthetic appearance without the need for a grease absorption device or the need to dispose of messy paper towels. Additionally, because these slices have been precooked, they will exhibit improved shelf life, further adding to the convenience of the present invention.

Having described the invention in detail and by reference to preferred embodiment thereof, it will be apparent that modifications and variations are possible without departing from the scope of the intended claims.

We claim:

1. A process for the preparation of bacon having improved taste and aesthetic appearance which is suitable for heating in a microwave oven comprising the steps of:

providing slices of uncooked bacon;

placing said slices of uncooked bacon between a pair of screen members;

conveying said uncooked bacon between said screen members into a bath of hot cooking oil containing bacon grease;

maintaining said bacon in said bath for a period of time sufficient to cook said bacon to the desired degree of crispness;

conveying the cooked bacon from said bath to a drying station;

drying said cooked bacon to remove excess oil and/or grease, to provide dried, cooked bacon; and removing said bacon from between said screen members;

wherein said drying is performed by contacting said cooked bacon with dry steam at about 125 lbs./in.$^2$ pressure to remove oil and grease deposits from said cooked bacon.

\* \* \* \* \*